(12) United States Patent
Trockels et al.

(10) Patent No.: US 10,440,961 B2
(45) Date of Patent: Oct. 15, 2019

(54) MULTIVARIABLE BAKING METHOD AND DEVICE THEREFOR

(71) Applicant: Kuchenmeister GmbH, Soest (DE)

(72) Inventors: Hans-Günter Trockels, Soest (DE); Rüdiger Jank, Glienicke (DE); Bernd Nasse, Welver (DE)

(73) Assignee: Kuchenmeister GmbH, Soest (DE)

(*) Notice: Subject to any disclaimer, the term of this patent is extended or adjusted under 35 U.S.C. 154(b) by 153 days.

(21) Appl. No.: 15/324,860

(22) PCT Filed: Jul. 2, 2015

(86) PCT No.: PCT/EP2015/065105
§ 371 (c)(1),
(2) Date: Jan. 9, 2017

(87) PCT Pub. No.: WO2016/005264
PCT Pub. Date: Jan. 14, 2016

(65) Prior Publication Data
US 2017/0202226 A1 Jul. 20, 2017

(30) Foreign Application Priority Data
Jul. 10, 2014 (DE) .................. 10 2014 213 450

(51) Int. Cl.
*A21D 8/02* (2006.01)
*A21C 3/02* (2006.01)
(Continued)

(52) U.S. Cl.
CPC .................. *A21D 8/02* (2013.01); *A21B 7/00* (2013.01); *A21C 3/02* (2013.01); *A21C 3/022* (2013.01); *A21C 13/00* (2013.01)

(58) Field of Classification Search
CPC ............. A21C 14/00; A21C 1/00; A21B 7/00
See application file for complete search history.

(56) References Cited

U.S. PATENT DOCUMENTS 1,476,910 A * 12/1923 Naugle .................. A21B 3/132
220/23.2
2,114,951 A * 4/1938 Young ...................... A21C 3/08
425/182
(Continued)

FOREIGN PATENT DOCUMENTS

DE 102008056881 A1 5/2010
GB 2274768 A 8/1994
(Continued)

OTHER PUBLICATIONS foodprocessingtechnology.com 2011 https://web.archive.org/web/20110101144000/https://www.foodprocessing-technology.com/projects/warburtons-super/. (Year: 2011).*
(Continued)

*Primary Examiner* — Felicia C Turner
(74) *Attorney, Agent, or Firm* — The Webb Law Firm

(57) ABSTRACT

A multivariable method for continuously producing bakery products including: producing a first dough phase, applying the first dough phase to a first conveyor belt, inputting the relaxed first dough phase into a second kneading device and producing a second dough phase, applying the second dough phase to a second conveyor belt, transferring the dough strip onto a third conveyor belt, folding the dough strip, inserting the dough strip into a second rolling device, cutting the dough strip into a predetermined number of dough pieces, loading baking molds with the dough pieces, fermenting the dough pieces baking the dough pieces, removing the baked bakery product, and cooling the bakery product, and cooling the baking molds after the baked bakery product has been removed.

21 Claims, 1 Drawing Sheet

(51) Int. Cl.
*A21C 13/00* (2006.01)
*A21B 7/00* (2006.01)

(56) References Cited

U.S. PATENT DOCUMENTS

| | | | | |
|---|---|---|---|---|
| 2,652,791 A | * | 9/1953 | Liston | A21B 3/18 198/482.1 |
| 2,654,672 A | * | 10/1953 | Selman, Jr. | A21D 2/362 426/634 |
| 2,942,284 A | * | 6/1960 | Luker | A47L 15/39 15/56 |
| 3,055,318 A | * | 9/1962 | Engels | A21C 3/02 425/182 |
| 3,375,117 A | * | 3/1968 | Schremmer | A21D 6/001 426/549 |
| 5,853,783 A | | 12/1998 | Rijkaart | |
| 6,156,364 A | * | 12/2000 | Meibach | A21C 11/004 425/585 |
| 6,168,812 B1 | * | 1/2001 | Paulucci | A21C 9/086 426/107 |
| 2003/0003211 A1 | | 1/2003 | Kanafani et al. | |
| 2004/0076725 A1 | | 4/2004 | Hayashi et al. | |
| 2004/0118392 A1 | * | 6/2004 | McFadden | A21B 1/245 126/21 A |
| 2005/0249845 A1 | | 11/2005 | Mihalos et al. | |
| 2007/0054025 A1 | * | 3/2007 | Santini | A21D 8/02 426/549 |
| 2008/0095885 A1 | * | 4/2008 | Hayashi | A21D 8/02 426/18 |
| 2009/0246318 A1 | * | 10/2009 | Johansen | A21D 2/145 426/21 |
| 2012/0052155 A1 | | 3/2012 | Grote et al. | |

FOREIGN PATENT DOCUMENTS

| | | | | |
|---|---|---|---|---|
| IE | | 64448 B2 | 8/1995 | |
| WO | WO 2013131673 | * | 9/2013 | F24C 15/00 |

OTHER PUBLICATIONS

Noelle Carter "Test Kitchen tips: Resting the dough" Feb. 13, 2012 Los Angeles Times http://latimesblogs.latimes.com/dailydish/2012/02/test-kitchen-tips-relaxing-the-dough.html (Year: 2012).*
Ishikura et al. (JP 2004-267145 Derwent Abstract). (Year: 2004).*
"Pan bread lines WP Industrial Bakery Technologies", Werner & Pfleiderer Industriele Backtechnik GmbH, Jul. 4, 2014.
"Flatbreads at high speed", Baking + Biscuit, 2013, pp. 34-36, Issue 01.
"Industrie-Anlagen für die Herstellung von Frischbackwaren", Werner & Pfleiderer Industrielle Backtechnik GmbH, 2011.

* cited by examiner

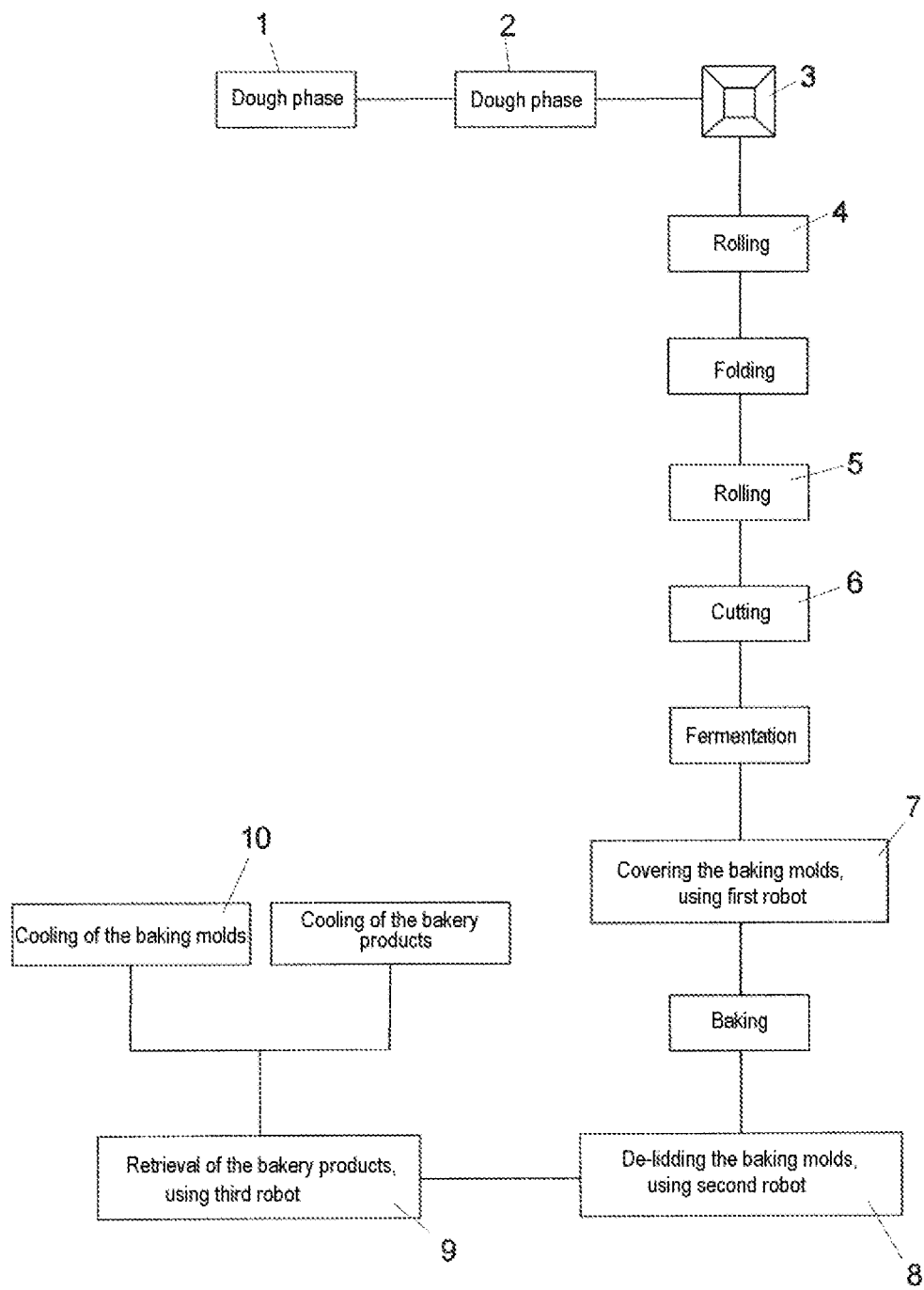

MULTIVARIABLE BAKING METHOD AND DEVICE THEREFOR

CROSS-REFERENCE TO RELATED APPLICATIONS

This application is the United States national phase of International Application No. PCT/EP2015/065105 filed Jul. 2, 2015, and claims priority to German Patent Application No. 10 2014 213 450.1 filed Jul. 10, 2014, the disclosures of which are hereby incorporated in their entirety by reference.

BACKGROUND OF THE INVENTION

Field of the Invention

The present invention relates to a multivariable method for the continuous production of bakery products, in particular of bakery products from biologically loosened wheat doughs and to a device for carrying out this method.

Description of Related Art

Bakery products from biologically loosened wheat doughs are products that are generated by alcoholic fermentation of yeast and/or sourdough, and by the gas (loosening gas) that is formed during the fermentation. Worldwide, biologically loosened wheat doughs are produced in the form of bread, such as toast loaves, tin wheat loaves, sandwich loaves, and small wheat bakery items such as bread rolls, milk rolls, brioche, croissants, etc. Depending on the production structure and on the type of bread, bakery products are produced from biologically loosened wheat doughs by separate technological methods. Apart from the traditional artisan production, industrial production has proven successful over the last three decades, increasingly overtaking artisan production. This applies in particular to the production of toast loaves, sandwich loaves, and milk rolls.

The industrial production of these bakery products is performed according to various methods. In this way, the production of dough for toast loaves and for sandwich loaves is carried out in batches in kneaders. Intensive kneaders are often used in the case of toast loaves and sandwich loaves, in order for the typically fine pore pattern of these types of bread to be achieved. Moreover, the production of dough is to some extent performed under variable atmospheric pressure. The use of continuous kneaders, by virtue of the desired quality properties, is rare.

Following the kneading procedure, the dough for toast loaves or sandwich loaves is portioned by a machine, is shaped using molding machines, and is subjected to a dual-stage fermentation process. The first, shorter fermentation phase serves for relaxing the dough. In this phase, the protein matrix of the dough that has been structured by the molding process relaxes and is reduced in terms of the elastic properties thereof.

After the first fermentation phase, the round dough pieces are deformed so as to be elongate, and are optionally cut into four parts. The four separated dough pieces are partially connected at the cut faces thereof. As a result, controlled and defined depositing of the dough pieces into molds is not possible and arbitrary. After the dough portions have been deposited in molds or in mold formations, respectively, the post-fermentation process is performed. The loosening gas which is primarily composed of carbon dioxide and alcohol is formed by alcoholic fermentation during the post-fermentation process.

A further method for producing bread is the continuous rolling method in which the endless dough sheets are rolled up, cut, and deposited in mold formations.

After the fermentation process, the molds are transported to the oven. The mold formations, prior to being pushed into the baking oven, are closed with lids, using mechanical devices, and are mechanically pushed into the baking oven. Continuous ovens or tunnel ovens are often used as ovens. Removing the baking molds from the oven and emptying the oven at the end of the baking process is typically performed in a similar manner, likewise using mechanical devices. In the case of a changeover of types, that is to say from toast loaves to milk rolls, for example, or from toast loaves to sandwich loaves, said changeover typically being associated with a changeover of the baking molds, the respectively used baking molds are transported by complex transportation systems to the depots and stored in the latter.

The production of dough of small wheat bakery items on an industrial scale is likewise performed using kneading systems, wherein the kneaders used operate in batches or else continuously. In the case of industrially produced milk rolls, the dough is portioned in separating and molding machines, and is shaped so as to be round, after the preparation of the dough. After a brief relaxation phase that is completed in a transportation system, the dough portions are longitudinally rolled and deposited onto trays or into molds, respectively. The baking process is subsequently performed in continuous ovens, wherein the feeding and emptying of the oven is likewise carried out using mechanical systems. The mechanical systems are composed of transportation belts and entrainment elements that guide the mold formations. Cutting of the dough portions on the dough surface is performed prior to or after the fermentation process by mechanical cutting installations.

A technological separation of the baking procedures and production installations between small bakery items such as bread rolls and milk rolls, and large bakery items such as toast loaves and sandwich loaves is typical of the industrial production according to the prior art to date. However, this technological separation of the various types of bakery items is unfavorable and uneconomical.

SUMMARY OF THE INVENTION

Accordingly, an object of the present invention has been to provide a method which enables the production of large bakery items and small bakery items in one production line.

This object is achieved according to the invention by a method having features as described herein.

Accordingly, a multivariable method for the continuous production of bakery products, in particular bakery products from biologically loosened wheat doughs, comprising the following steps, is provided:

a) producing a first dough phase in at least one first kneading device, in particular one first continuous kneader;

b) applying the first dough phase onto a first transportation belt, in order to relax the dough;

c) introducing the relaxed first dough phase into at least one second kneading device, in particular one second continuous kneader, and producing a second dough phase, in particular with dissimilar input of energy;

d) applying the second dough phase from the second kneading device onto a second transportation belt;

e) transferring the dough from the second transportation belt by way of at least one dough sheeter, so as to form a dough sheet, to a third transportation belt having at least one first rolling device, and transferring the rolled dough sheet to a fourth transportation belt for relaxation;

f) folding the rolled relaxed dough sheet;

g) inducing the folded dough sheet into at least one second rolling device, in particular having variable product-dependent shear forces;

h) cutting the dough sheet into a predetermined number of dough portions;

i) filling baking molds having predefined constant dimensions with the dough portions;

j) fermenting the dough portions in the open baking molds;

k) optionally automated covering of the baking molds that are filled with the fermented dough portions;

l) baking the dough portions in the baking molds, in particular in the covered or open baking molds with the application of variable heat transfers;

m) optionally automated removal of the cover from the baking molds;

n) automated retrieval of the baked bakery product from the baking mold, and cooling of the bakery product; and o) cooling the baking molds after retrieval of the baked bakery product, in particular by using a water jet.

The present method enables the use of one production line for producing bakery products, in particular from wheat doughs of dissimilar size and shape, in one production line. The present method has redundancies that enable products to be swapped between the baking lines. The method is constructed based on the principle of a kit system, on account of which a multivariable design of the operation is achieved.

By using the continuous dough kneaders with two separate dough troughs that are connected by way of a relaxation belt, it is henceforth possible for the input of energy to be controlled as a function of the recipe and of the desired structure of the baked item. The desired fine porosity of the bakery products is achieved by the mechanical shearing of the dough during the rolling process and by the folding process of the rolled dough sheet, and by repeated shearing by rolling units. As a result, the advantages of an intensive kneader are compensated for, in particular in terms of the fine porosity.

By way of the present combination of various shear forces and shear intensities in the kneading devices, and by way of the associated input of energy during the kneading process, and by way of the subsequent relaxation method, various dough and bakery-item structures may be produced.

Dissimilar dough structures may be produced in one production line in particular by way of the present arrangement of roller systems and folding systems having the associated variable shear forces.

In a first embodiment of the present method, dough-forming raw materials are introduced into the first kneading device in order for the first dough, or the first dough phase, respectively, to be formed in the first kneading device. Herein, dough-forming raw materials comprise in particular water, sourdough, and dry matter such as flour, emulsifiers, and optionally small amounts of sugar. The kneading device used may, as has already been mentioned, be configured in the form of a worm, or of a worm kneader, respectively.

Kneading in the first kneading device which is preferably configured in the form of a first worm is performed at a temperature between 20 and 30° C., preferably 22 to 29° C., particularly preferably between 24 and 26° C.

After completion of the formation of the first dough phase in the first kneading device, the dough phase, according to the invention, is applied or transferred, respectively, onto a transportation belt, wherein a relaxation of the first dough phase on the transportation belt (or the relaxation belt, respectively), takes place over a period of 10 seconds to 10 minutes, preferably of 30 seconds to 5 minutes, depending on the dough produced.

In a further embodiment of the present method, dough-stressing raw materials are infed to the second dough phase into the at least one second kneading device, for example a kneader. Dough-stressing raw materials are understood in the present case to be in particular fats, oils, aromatic substances, sugar, glycerin, and the like. Kneading in the second kneading device, which is likewise present in the form of a worm, may also be considered to be post-kneading.

The dough temperature in the second kneading device is in particular in a temperature range between 25 and 35° C., preferably between 27 and 30° C., most preferably 29° C., depending on the dough to be produced in each case.

The throughput of the second kneader, or of the second kneading device, respectively, is determined by setting the revolutions per minute. Dissimilar kneading intensities give rise to dissimilar bakery-item structures as a result. Also, the output of the first kneading device and of the second kneading device may differ from one another, so as to obtain the desired dough structures. In this way, the output of the first kneader may be in a range between 40 and 50 Hz, while the output of the second kneader is in a range between 30 and 40 Hz, preferably between 35 and 40 Hz, depending on the bakery-item structure. The first and the second kneader here may preferably be disposed so as to be mutually vertical, on account of which a space-saving arrangement is enabled.

As has been discussed above, the dough phase from the second kneader, or from the second kneading device, respectively, is applied onto a second transportation belt, so as to form a dough sheet (see step d). From the second transportation belt, the inhomogeneous dough sheet passes into at least one dough sheeter which is configured in the form of a funnel device and on or below the funnel opening, respectively, disposes of at least one roller pair, preferably two or three roller pairs. The dough mass is deposited as a homogenously formed dough sheet perpendicularly or vertically, respectively, onto a third, horizontally revolving transportation belt by way of the funnel and of the at least one roller pair.

At least one first rolling device is provided on this third transportation belt. The rolling device preferably comprises a rolling unit having an upper and a lower motive-powered roller. It is also possible for a rolling unit having a plurality of rollers that run on a circular or elliptical path to be employed.

The dough sheet is preferably rolled or sheared, respectively, in this at least one first rolling device to a thickness of 3 to 50 mm, preferably 10 to 40 mm, in particular 20 to 35 mm. The dough thickness of the dough sheet after exiting the rolling device is determined in particular by the desired final product. In this way, the dough thickness or dough height of the dough sheet, respectively, after the first rolling device, in the case of the production of toast loaves, is approximately 6 mm, in the case of milk rolls approximately 4 mm, and in the case of ciabatta rolls approximately 10 mm.

The rolled dough sheet is subsequently transferred onto a fourth transportation belt for further relaxation.

In subsequent step f) of folding the relaxed dough sheet, the relaxed dough sheet is applied onto a fifth transportation belt from the fourth transportation belt. Depending on the desired type of bakery product to the produced, there are various possibilities for folding the relaxed dough sheet.

Thus, in a first variant i) of the folding process, the dough sheet, in order to be folded, may be applied onto the fifth transportation belt that is disposed vertically or perpendicularly to the fourth transportation belt. Herein, the dough sheet, during the transition of the dough sheet from the fourth transportation belt to the fifth transportation belt, may be folded in a manner transverse to the running direction of the fifth transportation belt. This may be performed by depositing the dough sheet in a multi-layered perpendicular manner, for example. The dough sheet is placed on top of itself or is laminated at a very minor falling height in this case, so as to simulate manual processing and in the process to increase the stability of the dough structure.

In a further, second folding variant ii), the dough sheet may be folded in a manner parallel with the running direction of the transportation belt, along the longitudinal axis of the dough sheet. Accordingly, in this variant, the dough sheet is folded inward in the running direction, wherein the lateral peripheries of the dough sheet are each folded over or folded inward, respectively, from the right or the left by 180° toward the central axis. The thickness of the dough sheet is increased by a factor of 10 to 30 by way of folding the dough sheet.

In a further embodiment of the present method, the folded dough sheet is rolled or sheared, respectively, in at least one second rolling device in step g) to a final dough thickness or dough-sheet thickness, respectively, of 2 to 20 mm, preferably 2 to 10 mm. Herein, the dough thickness to be set in the second rolling device is again dependent on the type of the desired baking mold. The final dough thickness for a toast loaf may be around 3 mm, for a milk roll around 2 mm, and in the case of ciabatta rolls around 5 mm, for example.

The second rolling device is configured in particular in the form of a quick reductor having a calibrator unit (calibration head with a roller drum), wherein a plurality of calibrator units, for example three, may be sequentially disposed. It is also possible for a multiple-roller system to be applied.

After the second rolling procedure, the dough sheets typically have a width of between 300 to 600 mm.

After folding and renewed rolling of the dough sheet, the latter, using a cutting device, is cut in step h) in the longitudinal direction and the transverse direction into a predetermined number of dough portions. The cutting of the dough sheet is preferably performed using a cutting roller and/or a guillotine.

Separating or splitting, respectively, of the cut dough pieces or dough portions is preferably brought about by dissimilar belt speeds of the transportation belts used, wherein the final dissimilar bakery-item sizes are determined by splitting the cut dough sheets into the individual pieces have dissimilarities.

During the cutting process, cutting of the dough sheets is initially performed in the longitudinal direction, and thereafter in the transverse direction. Herein, the longitudinally cut dough sheets are weighed and, depending on the desired product, the transverse cut of the weighed dough sheet is performed such that a defined weight of the desired bakery product is achieved at this position.

After the step of cutting the dough sheets into a predetermined number of dough portions, the cut dough portions are rolled up in the running direction to the transverse axis of said dough portions, and the rolled-up dough portions are molded to the predetermined shape, for example in molding ducts. The rolling-up of the dough portions may be performed by employing dragnets, for example. After rolling-up, compression of the rolls is preferably performed using a compression belt.

The modules, such as guide rails and rolling-up devices, that are used in the step of rolling up the dough portions and in shaping the dough portions are exchangeable such that a simple adaptation of the production method to the desired bakery product is readily possible.

In the further course of the method, the cut and rolled-up dough sheets are placed onto baking molds or baking trays in step i). The lateral faces of the baking molds that are employed preferably have a constant mutual ratio, that is to say that the baking molds are predefined with a predefined module dimension of 1100×1100 mm, for example, and may in particular have a square shape. The constant ratio of the lateral faces and the predefined module dimension enable transportation, loading, and unloading of the baking molds using the same systems. The use of a baking tray having an area of at least one square meter is particularly preferable, so as to enable a smooth procedure having low cycle rates. Also, the area of the baking tray is preferably square such that simple control of the transportation is enabled. Moreover, a square area of the baking tray enables a process-dependent rotation of the baking-tray molds, or of the baking tray, respectively, utilizing standardized exchangeable transportation sections.

After the incorporation of the dough portions into the baking molds, the dough portions are fermented in the open baking mold in a single step j) such that the separation into a pre- and post-fermentation system is dispensed with. The fermentation temperature of the dough portions in the open baking mold may be between 30 and 35° C., preferably between 32 and 34° C., wherein a fermentation time is between 30 and 120 min, preferably 45 and 115 min, particularly preferably between 50 and 100 min.

The relative air humidity during fermentation in the open baking mold may be between 75 and 95%, preferably between 80 and 90%, particularly preferably between 85 and 88%.

The fermentation temperature, the fermentation time, and the relative air humidity during the fermentation process are dependent in particular on the dough composition; for example, a dough for a toast loaf requires a fermentation time of 57 min at a fermentation temperature of 34° C. and a relative air humidity of 85%; a dough for a milk roll requires a fermentation time of 115 min at a fermentation temperature of 32° C. and a relative air humidity of 80%, and a dough for a ciabatta roll requires a fermentation time of 45 min at a fermentation temperature of 32° C. and a relative air humidity of 88%.

As has been mentioned above, step k) of covering the baking molds that are filled with the fermented dough portions may be performed in an automated manner. In one embodiment, automated covering of the baking molds, or of the baking trays, respectively, that are filled with the fermented dough portions is performed using a robot. The robot used may dispose of a camera system which monitors the correct positioning of the covers or lids, respectively, on the baking molds. Complex mechanical devices are thus dispensed with.

Baking of the dough portions in step l) may be performed in the baking molds at temperatures between 150 and 250° C., preferably between 180 and 240° C., particularly preferably between 200 and 220° C. The baking oven that is employed preferably has an oven temperature that gradually decreases as the dough portions pass through the oven. In this way, the oven temperature upon commencement (that is to say upon the unbaked dough portions entering the oven) may be between 200 and 240° C., and at the end of the baking zone (that is to say upon the baked dough portions exiting the oven) may be between 180 and 200° C.

In one embodiment of step l), the baking time is between and 35 min, preferably between 6 and 30 min, particularly preferably between 8 and 28 min, very particularly preferably between 10 and 26 min, depending on the dough and/or the dough weight to be baked.

In one variant of embodiment of the present method, a convection in the baking oven depending on the product to be baked is also employed. In this way, a vertical convection from the lower side of the oven and/or a horizontal convection onto the surface of the dough portions to be baked may not be desirable at all, be desirable only upon commencement of the baking time, or be desirable during the entire baking time, in the case of specific bakery products. It is also possible for a limited convection of, for example, 20 to 80%, preferably 40 to 60%, to be employed. It is particularly preferable for a convection of 30 to 60% to be applied at the commencement of the baking time.

In total, there are four possibilities available in the present method for the transfer of heat in the baking process, namely conduction, convection, radiation, and/or condensation. The baking oven preferably has a plurality of different baking zones, for example up to twelve different baking zones. The flow direction of the hot air in the baking zones is preferably designed such that said flow direction is mutually counterflowing, or mutually opposing, respectively. This prevents or restricts, respectively, any input of external air into the baking oven.

Depending on the type of bakery item, the baking process may progress at 100% utilization of the baking area or at less than and up to 50% below the utilization of the capacity of the baking oven, that is to say that the baking oven can be operated at various degrees of utilization. In order to enable uniform transmission of energy, respective controlling of the heat transfer is utilized. Thermal oil is preferably used as energy carrier, the former enabling a more precise closure of gaps. The input of energy may be precisely regulated in a product-specific manner by means of the already-mentioned convection by selectively switching on vertical and horizontal turbulences. A substantial advantage of the present method lies in the fact that the usually required use of two different ovens when dissimilar bakery-product doughs are used is dispensed with.

The baking process may be followed in step m) by automated removal of the cover or of the lids, respectively, from the baking molds. After removal of the cover from the baking molds, automated retrieval of the baked bakery products from the baking mold, and cooling of the bakery products is performed in step h). In one variant of the present method, the steps of automated removal of the cover from the covered baking molds and/or of automated retrieval of the baked bakery product from the baking mold, are in each case performed by a robot. Accordingly, the molds are in each case de-lidded after the baking process by one robot and emptied by a second robot. In the case of small bakery items having lower baking times and higher cycle rates, and bakery products baked without a cover, the two robots mentioned may advantageously carry out the same function. Also, in the case of a failure of one robot, the parallel robot may serve as a redundant system.

After the baked bakery product has been retrieved from the baking mold, cooling of the baking molds is performed in step o), wherein this cooling is performed using a water jet. Herein, the temperatures of the baking molds are cooled to temperatures between 20 and 30° C., preferably 25 and 30° C. The use of a water jet has proven favorable in terms of energy, since no high input of energy is required, as is the case with conventionally used blowers or other cooling means. The used amount of water of the water jet is chosen here such that the water completely evaporates. The amount of water required for the desired cooling may be between 100 and 400 g per baking mold, preferably between 150 and 350 g per baking mold, particularly preferably between 200 and 300 g per baking mold. The required amount of water depends here on the size of the baking mold and on the type of the baked bakery product, and is calculated according to the mold weight and the required temperature differential. The required amount of water, for example in the case of a 1070×1070 mm baking mold for toast loaves, is between 200 and 220 g, in the case of milk rolls between 350 and 380 g per baking mold, and in the case of ciabatta rolls between 150 and 170 g per baking mold.

In a further variant of the present method, the baking molds are stored on a working platform in the case of a product changeover. The storage space is preferably disposed in this case above the baking ovens, so as to be protected from dust. Transporting and stacking of the baking molds is preferably also performed in an automated manner, for example by a gantry robot. The baking-mold formations and the lids may have a specific self-stacking system which enables the robots to receive the baking molds and to store the latter in a freely stacked manner. The fixing of the baking-mold stacks is performed using stacking pins; shelf systems are thus no longer required.

The present method is distinguished in particular by the variability and flexibility thereof. It is therefore possible to produce dissimilar products by way of variable processing steps and varying technological building blocks (modules) with the present variable system.

The present system and method also allow coupling of the modules of the baking system to a second parallel (twin) system, on account of which a redundant factory system is created.

A device for the continuous production of bakery products in a method as described above is likewise the subject matter of the present invention.

Accordingly, the present device comprises
at least one first kneading device, and at least one second kneading device, which are interconnected by way of a first transportation belt;
at least one second transportation belt for transferring the dough sheet that exits the second kneading device into one at least one funnel device and onto at least one third transportation belt;
at least one first rolling device;
at least one fourth transportation belt for transferring the dough sheet that has been rolled in the first rolling device onto at least one fifth transportation belt;
at least one second rolling device for folding the dough sheet that has been infed on the fourth transportation belt;
at least one cutting device for cutting the dough sheet into a predetermined number of dough portions;
at least one device for filling the baking molds with the cut dough portions;
optionally at least one first robot for covering the baking molds that are filled with the fermented dough portions;

at least one baking oven for baking the dough portions in the baking molds;

optionally at least one second robot for removing the cover from the baking molds;

at least one third robot for retrieving the bakery products from the baking molds;

at least one first cooling device, in particular in the form of at least one water jet or water spray, for cooling the baking molds after retrieval of the baked bakery product; and at least one second cooling device, preferably cooling towers or belts, for cooling the bakery products.

The temperature of the cooled bakery product prior to packing is between 25° C. and 37° C., preferably between 27° C. and 33° C., particularly preferably between 28° C. and 30° C.

In terms of the details of the individual component parts of the device, reference is made to the respective description of the method steps.

BRIEF DESCRIPTION OF THE DRAWING

The present invention will be explained in more detail hereunder with reference to FIG. 1 by way of a plurality of exemplary embodiments. In the drawing:

FIG. 1 shows a schematic illustration of an embodiment of the method according to the invention.

DETAILED DESCRIPTION OF THE INVENTION

FIG. 1 shows a schematic overview of an embodiment of the present method, wherein a first dough phase is produced in a first kneader 1, for example a first kneading worm, from dough-forming raw materials such as wheat flour, water, and/or sourdough. After a predetermined time and an input of energy while kneading, which may vary depending on the desired bakery product, the first dough phase is deposited from the first kneader 1 onto a first transportation belt. The dough remains on the transportation belt or relaxation belt for a time of for example 30 s, before being introduced into the second kneader 2. Post-kneading of the dough is performed in the second kneader 2 with the addition of dough-stressing raw materials, in particular fat and other types of sugar and sugar-based alcohols.

After applying the second dough phase from the kneader 2 onto a second transportation belt, so as to form a second dough sheet, the latter is transferred from the second transportation belt by way of at least one dough sheeter 3 having a funnel device and roller pairs onto a third transportation belt. The dough sheeter 3 requires the formation of a homogenous dough sheet, which is deposited onto the third transportation belt. The third transportation belt is part of a lamination installation or dough-rolling installation that is provided with a roller that is disposed in a linear manner as first rolling device 4. Upstream of the rolling device, the thickness of the dough sheet that is deposited onto the third transportation belt is 40 mm, for example. The first rolling device 4 may be composed of a rolling-out unit or of a multiple-roller system which is equipped with an upper and a lower motive-powered roller, enabling the dough sheet to be rolled to a dough thickness or dough height, respectively, of 30 mm and less, depending on the desired bakery product. In this way, the dough thickness of the dough sheet after exiting the first rolling device 4 in the case of the production of a toast loaf is around 6 mm, in the case of milk rolls around 4 mm, and in the case of ciabatta rolls 10 mm.

A further relaxation step is performed once the dough sheet has exited the first rolling device 4 onto a fourth transportation belt. The relaxation step of the rolled dough sheet on the fourth transportation belt is followed by folding the relaxed dough sheet, either in the running direction or in a manner vertical to the running direction. The type of the folding procedure is again determined by the type of the desired bakery product. In this way, the rolled dough may be applied onto a fifth transportation belt that is disposed so as to be vertical to the fourth transportation belt, said rolled dough being deposited or laminated in a perpendicular multi-layered manner during the transition from the fourth transportation belt to the fifth transportation belt. The stability of the dough structure is increased as a result. The dough thickness is increased by a factor of 10 to 30.

In another variant, the dough is folded inward in the running direction of the running belt, that is to say laterally by 180° in relation to the central axis from the right or the left, as a result of which the dough-sheet thickness is increased by a factor of 10 to 30.

The folded dough sheet is subjected to a further shearing or rolling process, respectively, in a second rolling device 5 composed of a multiple-roller system and a calibrator unit. Shearing or rolling, respectively, of the folded dough sheet to a dough thickness of 2 mm and more, again depending on the desired bakery product, is performed in the second rolling device 5. In this way, the dough thickness after exiting the second rolling device 5 is around 3 mm for a toast loaf, around 2 mm for a milk roll, and around 5 mm for ciabatta rolls.

After the rolled dough sheet has exited the second rolling device 5 and been deposited onto a further transportation belt, the dough sheet is cut in the longitudinal direction and transverse direction into a predetermined number of dough portions, depending on the desired bakery product, using at least one cutting device 6.

Thus, in the case of a toast loaf, the dough sheet is first cut in the longitudinal direction (that is to say in the running direction of the dough sheet) into three dough sheets running in parallel, and the three dough sheets are subsequently cut in the transverse direction and rolled up in a manner perpendicular to the running direction. The dough portions thus obtained are subjected to a further cutting step into four equally sized dough pieces which are rotated in the running direction by 90° and are placed onto a square baking tray (1000×1000 mm, or 1100×1100 mm). One baking tray accommodates 24 toast loaves.

If milk rolls are to be obtained, the dough sheet is first cut in the longitudinal direction (that is to say in the running direction of the dough sheet) into a plurality (3 to 10, preferably 5 to 7) dough sheets running in parallel, and the longitudinally cut dough sheets are subsequently cut in the transverse direction. The dough portions thus obtained are again rolled up in a manner perpendicular to the running direction and are placed onto a square baking tray (for example 1000×1000 mm, or 1100×1100 mm). One baking tray may comprise 84 milk rolls, for example.

Also in the case of ciabatta rolls, the dough sheet is first cut in the longitudinal direction (running direction of the dough sheet) into a plurality of dough sheets running in parallel, the latter being subsequently cut in the transverse direction. The dough portions thus obtained are again rolled up in a manner perpendicular to the running direction and are placed onto a baking tray (1000×1000 mm). One baking tray may comprise 70 ciabatta rolls, for example.

After the dough portions have been cut and deposited into the respective baking molds, the fermentation process is performed in the baking molds at varying fermentation temperatures which are chosen depending on the desired bakery product. After the fermentation process, the baking molds, using a first robot 7, may be covered with respective lids. The covered baking molds are infed to the baking oven and are baked for a predetermined time that depends on the desired bakery product. Toast loaves and sandwich loaves are preferably lidded prior to the baking process. However, the latter may also be baked without lids, like small bakery items.

Using at least one second robot 8, de-lidding of the baking molds is performed after the baking process, and retrieval of the bakery products is performed using a third robot 9.

After retrieval of the bakery products by way of the at least one third robot 9, the baking molds are cooled using a water jet 10 and water evaporation. The amount of water for cooling the molds is calculated according to the mold weight and the required temperature differential.

The bakery products are cooled and subsequently packed.

The parameters for methods for the production of toast loaves, milk rolls, and ciabatta rolls are illustrated in a summarized manner in the following table.

| Parameter | Toast loaf | Milk roll | Ciabatta roll |
|---|---|---|---|
| Dough temperature kneader 1 | 24° C. | 26° C. | 29° C. |
| Dough temperature kneader 2 | 27° C. | 29° C. | 30° C. |
| Output 1$^{st}$ kneader | 50 Hz | 50 Hz | 40 Hz |
| Output 2$^{nd}$ kneader | 40 Hz | 35 Hz | 40 Hz |
| Gap width calibrator unit 1 | 6 mm | 4 mm | 10 mm |
| Gap width calibrator unit 2 | 3 mm | 2 mm | 5 mm |
| Fermentation temperature | 34° C. | 32° C. | 32° C. |
| Fermentation time | 57 min | 115 min | 45 min |
| Relative air humidity (fermentation) | 85% | 80% | 88% |
| Baking time | 25 min | 10 min | 12 min |
| Oven temperature | 200° C.-190° C. | 220° C.-180° C. | 240° C.-200° C. |
| Vertical convection from below | Total baking time | Without vertical convection | 30% upon commencement of the baking time |
| Horizontal convection onto the surface of the baked goods | Without convection | Upon commencement of the baking time | 60% upon commencement of the baking time |
| Mold cooling by water evaporation | 212 g water per mold | 372 g water per mold | 159 g water per mold |
| Mold dimensions | 1070 × 1070 mm | 1070 × 1070 mm | 1070 × 1070 mm |
| Products per mold | 24 | 98 | 70 |

The invention claimed is:

1. A multivariable method for the continuous production of large bakery items and small bakery items in a single production line, comprising:

producing a first dough phase from dough-forming raw materials at a temperature of 20° C. to 30° C. in at least one first continuous kneading device;

applying the first dough phase from the first kneading device onto a first transportation belt in order to relax the dough;

introducing the relaxed first dough phase into at least one second continuous kneading device and producing a second dough phase by feeding dough-stressing raw materials at a temperature of 25° C. to 35° C.;

applying the second dough phase from the second kneading device onto a second transportation belt, thereby forming an inhomogeneous dough sheet on the second transportation belt;

transferring the inhomogeneous dough sheet from the second transportation belt to a third transportation belt by way of at least one dough sheeter, the dough sheeter producing a homogenous dough sheet on the third transportation belt, the third transportation belt having at least one first rolling device which shears the homogenous dough sheet to a thickness of 3 mm to 50 mm thereby forming a rolled dough sheet, and transferring the rolled dough sheet onto a fourth transportation belt for relaxation;

folding the rolled relaxed dough sheet;

introducing the folded dough sheet into at least one second rolling device, wherein the folded dough sheet is sheared to a thickness of 2 mm to 20 mm;

cutting the dough sheet into a predetermined number of dough portions;

filling square-shaped baking molds or square-shaped baking trays having predefined constant dimensions with the dough portions;

fermenting the dough portions in the open baking molds;

baking the dough portions in the baking molds or trays, wherein a baking oven that is used for baking includes a plurality of baking zones having at least four heat-transfer variants comprising conduction, convection, radiation, and condensation, and wherein the baking oven may be operated at dissimilar load levels;

automated retrieval of the baked bakery product from the baking mold, and cooling of the bakery product; and cooling the baking molds or trays after retrieval of the baked bakery product.

2. The method as claimed in claim 1, wherein the step of folding the relaxed dough sheet comprises folding the relaxed dough sheet onto a fifth transportation belt, in a manner transverse to the running direction of the fifth transportation belt, that is disposed perpendicularly to the fourth transportation belt.

3. The method as claimed in claim 1, wherein the homogeneous dough sheet is folded in a manner parallel with a running direction of the transportation belt, along a longitudinal axis of the dough sheet.

4. The method as claimed in claim 1, wherein the folded dough sheet is rolled in the at least one second rolling device to a final dough thickness of 2 mm to 10 mm.

5. The method as claimed in claim 1, wherein the dough sheet, after folding and renewed rolling, is cut in a longitudinal direction and in a transverse direction into a predetermined number of dough portions by using at least one cutting device.

6. The method as claimed in claim 1, wherein the cut dough portions are rolled up in a running direction, to transverse axis of said dough portions, and the rolled-up dough portions are molded to a predetermined shape.

7. The method as claimed in claim 1, wherein lateral faces of the baking molds are identical.

8. The method as claimed in claim 1, wherein the fermentation temperature is between 30 and 35° C. and the fermentation time is between 30 and 120 min.

9. The method as claimed in claim 1, wherein the dough portions are baked in the baking molds at temperatures between 150 and 250° C.

10. The method as claimed in claim 1, wherein the baking time is between 5 and 35 min depending on the dough to be baked.

11. The method as claimed in claim 1, wherein the convection heat-transfer variant of the baking oven is precisely regulated in a product-specific manner by selectively switching on vertical and horizontal turbulences.

12. The method as claimed in claim 1, wherein the cooling of the baking molds after retrieval of the baked bakery product is performed using a water jet at temperatures between 20 and 30° C.

13. A device for carrying out a method as claimed in claim 1, the device comprising:
    at least one first kneading device, and at least one second kneading device, which are interconnected by way of a first transportation belt;
    at least one second transportation belt for transferring the dough sheet that exits the second kneading device into one at least one funnel device and onto at least one third transportation belt;
    at least one first rolling device;
    at least one fourth transportation belt for transferring the dough sheet that has been rolled in the first rolling device onto at least one fifth transportation belt;
    at least one second rolling device for folding the dough sheet that has been infed on the fourth transportation belt;
    at least one cutting device for cutting the dough sheet into a predetermined number of dough portions;
    at least one device for filling the baking molds with the cut dough portions;
    at least one baking oven for baking the dough portions in the baking molds;
    at least one robot for retrieving the bakery products from the baking molds;
    at least one first cooling device for cooling the baking molds after retrieval of the baked bakery product; and
    at least one second cooling device for cooling the bakery products.

14. The method as claimed in claim 1, further comprising automated covering of the baking molds that are filled with the fermented dough portions.

15. The method as claimed in claim 14, further comprising automated removal of the cover from the baking molds.

16. The method as claimed in claim 1, wherein a water jet is used to cool the baking molds after retrieval of the baked bakery product.

17. The method of claim 1, wherein the dough-forming raw materials for the first dough comprise water, sourdough, and flour, and the dough-stressing materials for the second dough phase comprise fat and sugar.

18. The method as claimed in claim 1, wherein the dough sheet is sheared in the first rolling device to a thickness of 10 mm to 40 mm.

19. The method as claimed in claim 18, wherein the dough sheet is sheared to a thickness of 20 mm to 35 mm.

20. The method as claimed in claim 16, wherein the automated covering of the baking molds that are filled with the fermented dough portions is performed using at least one robot.

21. The method as claimed in claim 17, wherein the automated removal of the covers from the covered baking molds, and the automated retrieval of the baked bakery product from the baking mold are performed in each case by means of a robot.

* * * * *

UNITED STATES PATENT AND TRADEMARK OFFICE
CERTIFICATE OF CORRECTION

| | |
|---|---|
| PATENT NO. | : 10,440,961 B2 |
| APPLICATION NO. | : 15/324860 |
| DATED | : October 15, 2019 |
| INVENTOR(S) | : Hans-Günter Trockels et al. |

It is certified that error appears in the above-identified patent and that said Letters Patent is hereby corrected as shown below:

In the Claims

Column 14, Line 28, Claim 20, delete "claim 16," and insert -- claim 14, --

Column 14, Line 32, Claim 21, delete "claim 17," and insert -- claim 15, --

Signed and Sealed this
Seventh Day of January, 2020

Andrei Iancu
*Director of the United States Patent and Trademark Office*